April 25, 1950
E. N. EKLUND
2,504,968
MILLING MACHINE
Filed March 29, 1945
2 Sheets-Sheet 1
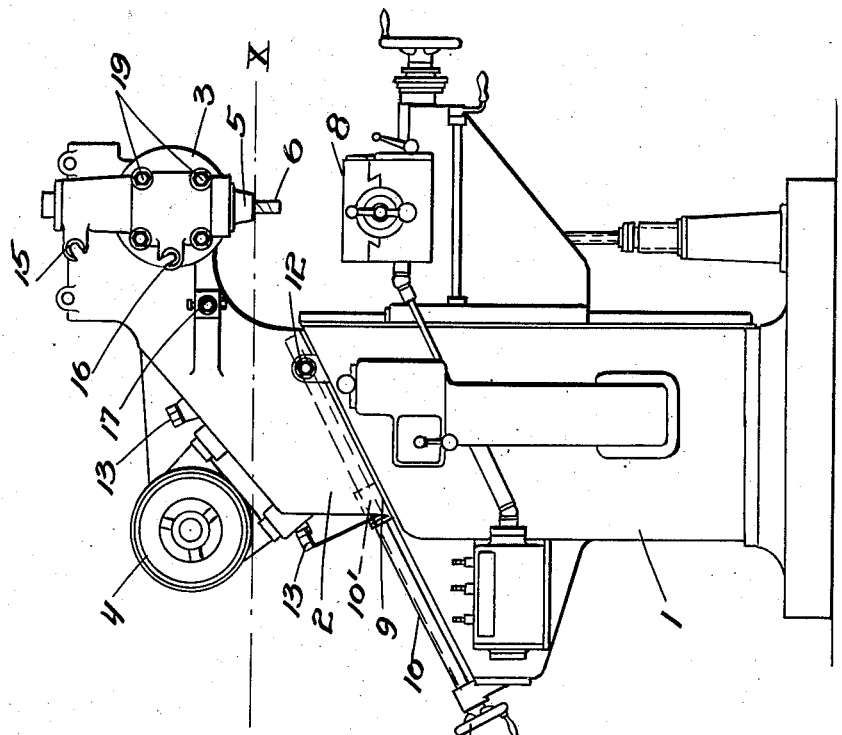
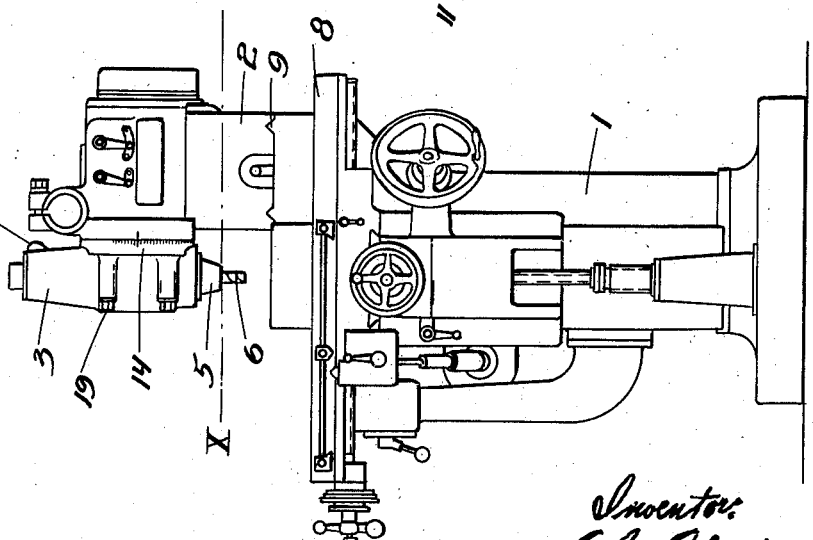

April 25, 1950 E. N. EKLUND 2,504,968
MILLING MACHINE
Filed March 29, 1945 2 Sheets-Sheet 2
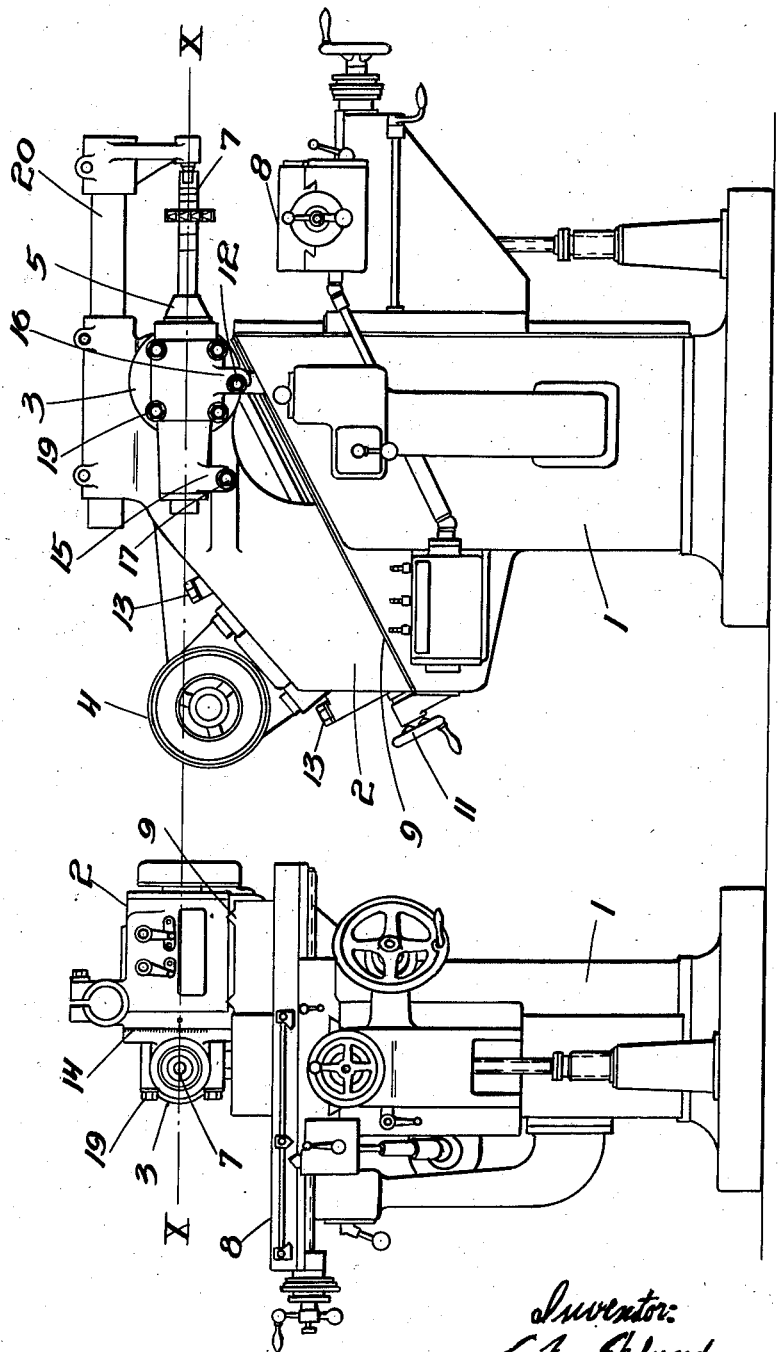

Patented Apr. 25, 1950

2,504,968

UNITED STATES PATENT OFFICE 2,504,968

MILLING MACHINE

Elias Napoleon Eklund, Stockholm, Sweden

Application March 29, 1945, Serial No. 585,501
In Sweden February 5, 1942

Section 1, Public Law 690, August 8, 1946
Patent expires February 5, 1962

4 Claims. (Cl. 90—17)

The present invention relates to milling machines, more especially to universal milling machines provided with a rotary spindle head, by means of which the spindle can be orientated in a vertical or a horizontal or an intermediate position. In known machinees of this kind, the spindle head is generally arranged upon the machine standard, but machines having a slidable spindle head stock mounted on a horizontal bed on the machine standard are also known. These known machines have the disadvantage, that the milling cutter placed on the spindle will assume a greater height from the floor, when the spindle is horizontally orientated than when the spindle is vertically orientated. In milling machines, as in other working machines, it is of utmost importance, that the tool proper is placed at a convenient height in order that the worker may easily oversee the work and perform necessary manipulations without having to turn and twist. If therefore in the known machines the milling cutter is placed at the right height when the spindle is in vertical position, the cutter will be lifted too much from the floor, when the spindle is placed in the horizontal position. Hereby the output is greatly affected.

The main object of the present invention therefore is to provide a milling machine with rotary spindle head in which the milling cutter can be placed at the height most convenient for obtaining the greatest output, either the spindle is placed in a vertical or in a horizontal position.

Other objects of the invention will be apparent from the following description showing an embodiment of the invention. It shall be pointed out, that the invention is not limited to the constructional features shown by way of example on this drawing as many other forms of execution can be used as will be apparent to those skilled in the art.

Fig. 1 shows a milling machine in side elevation, the spindle being orientated in vertical position, Fig. 2 the same, as seen from the right side of Fig. 1, Fig. 3 shows a side elevation of the milling machine similar to Fig. 1, but with the spindle orientated in horizontal position, and Fig. 4 shows the same, seen from the right side of Fig. 3.

The machine shown in the drawing has a machine standard 1 and a spindle head stock 2, on which the spindle head 3 is mounted in such a known manner that it can be rotated around a horizontal axis. In the spindle head the working axle can be driven by means of an electric motor 4 mounted on the head stock 2. The spindle has a chuck 5, in which the milling cutter 6 or a spindle 7 for carrying such milling cutter can be fixed. The machine table 8 is in a manner known per se mounted in such a way as to be displaced in proper guides either by hand or by means of machine power in vertical and in horizontal directions. The table can also be swung about a horizontal axis.

All these parts are generally known and used in ordinary milling machines and do not form part of the present invention, which only consists therein, that the head stock 2 is mounted on a slanting bed 9 upon the machine standard 1 and therein, that the angle of inclination and the length of the slanting bed having such dimensions, that a displacement of the stock along the slanting bed from one end to the other will cause an alteration of the height of the milling cutter above the floor equal to the alteration caused by a shifting of the orientation of the spindle from the vertical to the horizontal position by turning the spindle head. The displacement of the head stock 2 is caused by means of a screw 10 rotatably mounted on the standard 1, which screw is prevented from moving lengthwise, and which on its free end has a manoeuvering handle 11 and is passed through a nut 10' mounted on the head stock in engagement with the screw. For limiting the movement of the head stock a stop 12 is used. For fixing the stock to the main standard two clamping bolts 13 are used. The spindle head 3 is provided with a scale 14 for indicating the inclination of the spindle. The head 3 further has two stops 15 and 16, cooperating with clamping screws, one of which consists of the above-mentioned stop 12, mounted on the machine standard for limiting the displacement of the head stock, whereas the other stop 17 is mounted on the head stock. A stop 18 is used for limiting the rotation of the spindle head in the vertical position. The clamping of the spindle head in the desired position can be performed in known manner by means of bolts 19. In using the machine for horizontal milling an overhanging arm 20 may be used.

The displacement of the machine from the position shown in Figs. 1 and 2 to the position shown in Figs. 3 and 4 is performed in the following way. First the bolts 19 are loosened, whereafter the spindle head 3 is turned anticlockwise on Fig. 2 until the stop 15 catches the stop bolt 17, which thereupon is clamped. Hereafter the bolts 19 are also clamped whereby the spindle head is clamped on the stock 2. Thereafter the bolts 13 are loosened. Now the stock 2 is free and can be displaced along the bed 9 to the position shown in Fig. 4 by means of the handle 11. In this position the stop 16 catches the stop bolt 12 which thereupon is clamped. Hereafter the bolts 13 are clamped again, whereupon the head stock 2 again is clamped to the main standard in the new position. Hereupon the cutter spindle 7 is inserted in the chuck 5 and the overhanging arm 20 is fastened on the machine. The displacement of the parts for vertical milling as shown in Figs. 1 and 2 is performed in the opposite direction. As will be seen from the drawing the milling cutter 6 and the spindle 7 will be placed approximately at the same height from the floor when the parts are positioned for vertical milling and for horizontal milling. This is indicated by means of the horizontal line X on the drawing.

As mentioned before the form of execution shown on the drawing is only illustrative and the different parts of the machine and their arrangement can be altered in many ways without passing the bounds of the invention. Especially it shall be pointed out, that the bed 9 must not necessarily have the form shown on the drawing and that the different stops for limiting the displacement of the stock 2 and the head 3 can be executed in many other ways than those shown.

What I claim and desire to secure by Letters Patent is:

1. In a universal milling machine the combination of a main standard having a base and a working table, a bed carried by said standard slanting downwardly from a high point in proximity to said working table, a spindle head stock mounted to slide up and down said slanting bed on said standard, a spindle head mounted on said spindle head stock, means journaling the spindle head for rotation relative to said head stock whereby the spindle may be changed from the vertical to a horizontal position and vice versa, and means for displacing said head stock along said bed in a direction to and from the said working table of the machine thereby raising or lowering said spindle head.

2. A universal milling machine as claimed in claim 1, the angle of inclination and the length of the slanting bed having such dimensions, that a displacement of the head stock along the slanting bed from one end thereof to the other end thereof will cause an alteration of the height of a milling cutter mounted in said spindle head above said base equal to the alteration caused by a shifting of the orientation of the spindle of the rotary spindle head from the vertical to the horizontal position.

3. In a universal milling machine the combination of a main standard including a working table, an obliquely slanting bed having a high point in proximity to said working table carried by said standard, a spindle head stock slidably mounted on said slanting bed, a spindle head mounted on said spindle head stock, means journaling the spindle head for rotation relative to said head stock whereby the spindle may be changed from a vertical to a horizontal position and vice versa, means for displacing said head stock along said slanting bed in an oblique transverse direction to and from the said working table of the machine, and means for clamping the said rotary spindle head in position on said spindle head stock and the said stock on the said main standard.

4. In a universal milling machine the combination of a main standard having a base and a working table, a spindle head stock slidably mounted on an obliquely transversely slanting bed on said standard having a high point in proximity to said working table, a spindle head rotatable in a way to shift the orientation of the spindle from a vertical to a horizontal position and vice versa, and means for obliquely and transversely displacing said head stock along said bed in a direction to and from the working table of the machine, and means for clamping the rotary spindle head in position on said spindle head stock and the said head stock on the said main standard, the angle of inclination and the length of the slanting bed having such dimensions, that a displacement of the head stock along the slanting bed from one end thereof to the other end thereof will cause an alteration of the height of a milling cutter mounted in said spindle head above said base equal to the alteration caused by a shifting of the orientation of the spindle of the rotary spindle head from the vertical to the horizontal position.

ELIAS NAPOLEON EKLUND.

REFERENCES CITED

The following references are of record in the file of this patent:

UNITED STATES PATENTS

| Number | Name | Date |
| --- | --- | --- |
| 1,229,352 | Van Norman | June 12, 1917 |
| 1,908,478 | Eisele | May 9, 1933 |

FOREIGN PATENTS

| Number | Country | Date |
| --- | --- | --- |
| 487,390 | France | Apr. 8, 1918 |
| 560,734 | France | July 17, 1923 |